US011082337B2

(12) United States Patent
Drake (10) Patent No.: US 11,082,337 B2
(45) Date of Patent: Aug. 3, 2021

(54) SUPPORT FOR MULTIPLE VIRTUAL NETWORKS OVER AN UNDERLAY NETWORK TOPOLOGY (71) Applicant: Juniper Networks, Inc., Sunnyvale, CA (US)

(72) Inventor: John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 20 days.

(21) Appl. No.: 16/395,656

(22) Filed: Apr. 26, 2019

(65) Prior Publication Data

US 2020/0267078 A1    Aug. 20, 2020

Related U.S. Application Data (60) Provisional application No. 62/806,452, filed on Feb. 15, 2019.

(51) Int. Cl.
*H04L 12/26* (2006.01)
*H04L 12/46* (2006.01)
(Continued)

(52) U.S. Cl.
CPC .......... *H04L 45/64* (2013.01); *H04L 12/4641* (2013.01); *H04L 12/66* (2013.01); *H04L 45/02* (2013.01); *H04L 45/745* (2013.01)

(58) Field of Classification Search
CPC . H04L 12/4641; H04L 43/08; H04L 43/0852; H04L 45/64; H04L 43/0829;
(Continued)

(56) References Cited

U.S. PATENT DOCUMENTS 8,484,353 B1\* 7/2013 Johnson .................. H04L 47/70
709/226
9,794,165 B1   10/2017 Wood
(Continued)

OTHER PUBLICATIONS

Sangli et al. "BGP Extended Communities Attribute" Network Working Group, RFC 4360, Feb. 2006, 12 pp.
(Continued)

*Primary Examiner* — Sai Aung
(74) *Attorney, Agent, or Firm* — Shumaker & Sieffert, P.A.

(57) ABSTRACT

Techniques are described for supporting multiple virtual networks over an underlay network. The techniques may provide support for network slicing and enhanced virtual private networks (VPNs) over the underlay network. In general, the techniques include allocating a subset of resources (e.g., nodes and/or links) of the underlay network to a particular virtual network, and advertising the subset of resources to provider edge (PE) routers that are participating in the virtual network. A network controller device may advertise the subset of resources for the virtual network to the respective PE routers using BGP-LS (Border Gateway Protocol-Link State). Based on the advertisements, each of the PE routers generates a restricted view of the full underlay network topology for the virtual network and, thus, only uses the subset of resources in the restricted view to generate routing and forwarding tables for the virtual network.

8 Claims, 5 Drawing Sheets (51) Int. Cl.
  *H04L 12/715* (2013.01)
  *H04L 12/66* (2006.01)
  *H04L 12/751* (2013.01)
  *H04L 12/741* (2013.01)

(58) Field of Classification Search
  CPC . H04L 45/00; H04L 41/5019; H04L 43/0888;
       H04L 45/50; H04L 47/283; H04L
       63/0263; H04L 41/0803; H04L 41/0806;
       H04L 41/0896; H04L 43/0876
  See application file for complete search history.

(56) References Cited

U.S. PATENT DOCUMENTS

| | | | |
|---|---|---|---|
| 9,898,317 | B2 | 2/2018 | Nakil et al. |
| 2005/0094567 | A1* | 5/2005 | Kannan .............. H04L 41/5009 370/241 |
| 2005/0213513 | A1* | 9/2005 | Ngo .................... H04L 12/4641 370/254 |
| 2010/0043068 | A1* | 2/2010 | Varadhan ................ H04L 45/60 726/15 |
| 2011/0142053 | A1 | 6/2011 | Van Der Merwe et al. |
| 2014/0301192 | A1* | 10/2014 | Lee ....................... H04L 45/586 370/230 |
| 2015/0381493 | A1* | 12/2015 | Bansal .................. H04L 45/745 370/392 |
| 2017/0289027 | A1 | 10/2017 | Ratnasingham |
| 2017/0353394 | A1* | 12/2017 | Brandwine ............. H04L 47/70 |

OTHER PUBLICATIONS

P. Marques et al., "Constrained Route Distribution for Border Gateway Protocol/MultiProtocol Label Switching (BGP/MPLS) Internet Protocol (IP) Virtual Private Networks (VPNs)," Network Working Group, RFC 4684, Nov. 2006, 15 pp.

Gredler et al., "North-Bound Distribution of Link-State and Traffic Engineering (TE) Information Using BGP," RFC 7752, Internet Engineering Task Force (IETF), Mar. 2016, 48 pp.

Filsfils et al., "Segment Routing Architecture," Internet Engineering Task Force (IETF), RFC 8402, Jul. 2018, 33 pp.

Filsfils et al., "Segment Routing Architecture," Network Working Group, draft-filsfils-spring-segment-routing-04, Jul. 3, 2014, 18 pp.

Filsfils et al., "Segment Routing Use Cases" Network Working Group, draft-filsfils-rtgwg-segment-routing-use-cases-01, Internet—Draft, Jul. 14, 2013, 46 pp.

Filsfils et al., "Segment Routing with MPLS data plane" draft-filsfils-spring-segment-routing-mpls-03, Internet—Draft, Network Working Group, Jul. 31, 2014, 14 pp.

Mohapatra et al. "The BGP Encapsulation Subsequent Address Family Identifier (SAFI) and the BGP Tunnel Encapsulation Attribute" Network Working Group, RFC 5512, Apr. 2009, 13 pp.

Previdi et al., "Source Packet Routing in Networking (SPRING) Problem Statement and Requirements," RFC 7855, Internet Engineering Task Force, IETF, May 2016, 19 pp.

Psenak et al. "IGP Flexible Algorithm" Network Working Group, draft-ietf-lsr-flex-algo-07.txt, Internet—Draft, Apr. 1, 2020, 34 pp.

Raszuk et al. "Registered Wide BGP Community Values" IDR Working Group, draft-ietf-idr-registered-wide-bgp-communities-02, Internet—Draft, May 31, 2016, 18 pp.

U.S. Appl. No. 17/090,621 entitled "Bitmask Route Target in Targeted Distribution of Information Using a Routing Protocol", Juniper Networks, Inc. (inventor: Zhang) filed Nov. 5, 2020.

Extended Search Report from counterpart European Application No. 19199555.4, dated Feb. 21, 2020, 8 pp.

Response to the Extended Search Report dated Feb. 21, 2020 from counterpart European Application No. 19199555.4, filed Feb. 19, 2021, 21 pp.

* cited by examiner

SUPPORT FOR MULTIPLE VIRTUAL NETWORKS OVER AN UNDERLAY NETWORK TOPOLOGY

This application claims the benefit of U.S. Provisional Patent Application No. 62/806,452 filed on Feb. 15, 2019, the entire contents of which is incorporated herein by reference.

TECHNICAL FIELD

The invention relates to computer networks.

BACKGROUND

A wide variety of customer devices connect to service provider networks to access resources and services provided by packet-based data networks, such as the Internet, enterprise intranets, content providers, and virtual private networks (VPNs). Each service provider network typically provides an extensive network infrastructure to provide packet-based data services to the customer devices. The service provider networks may comprise a wide area network (WAN). In some examples, each service provider network may comprise a single autonomous system (AS) within a WAN that includes multiple ASes. In other examples, each service provider network may comprise two or more ASes within the WAN.

The network infrastructure of a service provider network typically includes a vast collection of access nodes, aggregation nodes and high-speed edge routers interconnected by communication links. These network devices typically execute various protocols and exchange signaling messages to anchor and manage subscriber sessions and communication flows associated with customer devices. A software defined network (SDN) controller may be included in the network architecture to provide centralized control of the subscriber sessions and communication flows within the service provider network. In some cases, a controller may provide centralized control over an entire WAN including multiple ASes.

SUMMARY

In general, techniques are described for supporting multiple virtual networks over an underlay network. The techniques may, for example, provide support for network slicing and enhanced virtual private networks (VPNs) over the underlay network. In general, the techniques include allocating a subset of resources (e.g., nodes and/or links) of the underlay network to a particular virtual network, and advertising the subset of resources to provider edge (PE) routers that are participating in the virtual network. In some examples, the subset of resources for the virtual network may be advertised from a network controller device to the respective PE routers using BGP-LS (Border Gateway Protocol-Link State).

Based on the advertisements, each of the PE routers generates a restricted view of the full underlay network topology for the virtual network and, thus, only uses the subset of resources in the restricted view to generate routing and forwarding tables for the virtual network. For example, each of the PE routers may annotate its link state database to indicate which resources of the underlay network are allocated for the particular virtual network. More specifically, a given PE router may add flags or other indicators to its link state database to mark the advertised subset of resources as usable by the PE router for the virtual network and, essentially, mask-off or ignore the remaining resources of the underlay network. In this way, instead of adding per-virtual network state on every resource in the underlay network, the disclosed techniques add per-virtual network state to only those PE routers participating in the respective virtual network.

In one example, this disclosure is directed to a controller device comprising a network interface, and a control unit comprising at least one processor. The control unit of the controller device is configured to allocate a subset of resources of an underlay network to each of one or more virtual networks established over the underlay network, wherein the subset of resources allocated to a respective virtual network includes one or more nodes and one or more links of the underlay network to be used by the respective virtual network. The control unit of the controller device is further configured to advertise the subset of resources to a plurality of PE routers that are participating in the respective virtual network as a restricted view of the underlay network for the respective virtual network.

In another example, this disclosure is directed to a router comprising a plurality of network interfaces, and a control unit comprising at least one processor. The control unit of the router is configured to receive an advertisement indicating a subset of resources of an underlay network allocated to a virtual network in which the router is participating, generate a restricted view of the underlay network based on the subset of resources for the virtual network, and perform routing services for the virtual network based on the restricted view of the underlay network.

In a further example, this disclosure is directed to a method comprising allocating, by a controller device, a subset of resources of an underlay network to each of one or more virtual networks established over the underlay network, wherein the subset of resources allocated to a respective virtual network includes one or more nodes and one or more links of the underlay network to be used by the respective virtual network; and advertising, by the controller device, the subset of resources to a plurality of PE routers that are participating in the respective virtual network as a restricted view of the underlay network for the respective virtual network. In some examples, the method further comprises receiving, by a respective PE router participating in the respective virtual network, an advertisement indicating the subset of resources of the underlay network allocated to the respective virtual network; generating, by the respective PE router, the restricted view of the underlay network based on the subset of resources for the respective virtual network; and performing, by the respective PE router, routing services for the respective virtual network based on the restricted view of the underlay network.

The details of one or more examples of the invention are set forth in the accompanying drawings and the description below. Other features, objects, and advantages of the invention will be apparent from the description and drawings, and from the claims.

DETAILED DESCRIPTION

Figure 1:
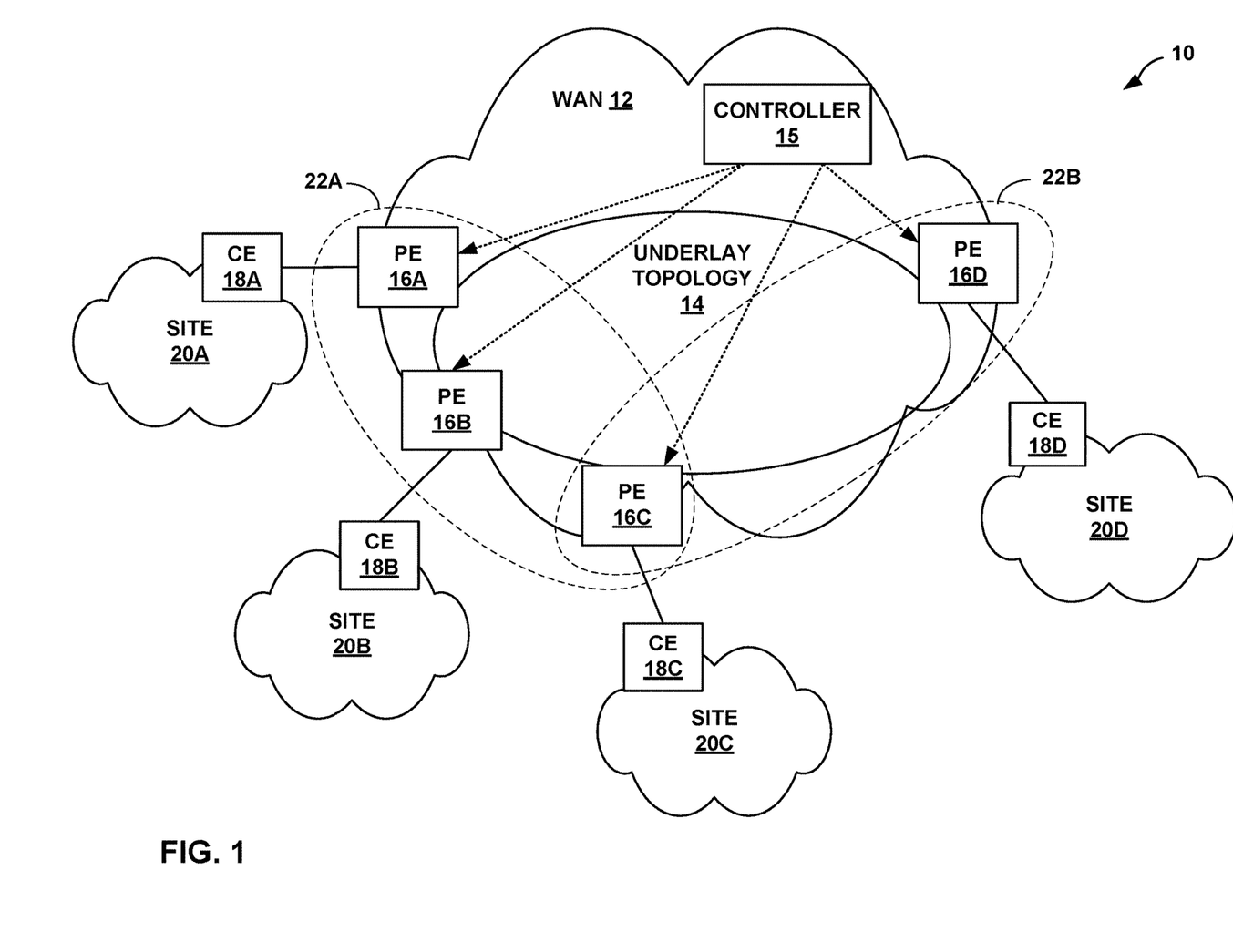
FIG. 1 is a block diagram illustrating an example wide area network having a controller and provider edge (PE) routers configured to support multiple virtual networks over an underlay network topology, in accordance with the techniques of this disclosure.

FIG. 1 is a block diagram illustrating an example wide area network (WAN) having a controller and provider edge (PE) routers configured to support multiple virtual networks over an underlay network topology, in accordance with the techniques of this disclosure.

As illustrated in FIG. 1, network system 10 includes WAN 12 having underlay topology 14 and a plurality of remote sites 20A-20D ("sites 20") connected to WAN 12. In some examples, WAN 12 may support one or more virtual networks 22A, 22B ("virtual networks 22") on top of underlay topology 14 in order to connect one or more of sites 20 across WAN 12. More specifically, virtual networks 22 may enable sites 20 to securely share data over WAN 12. For example, virtual networks 22 may comprise virtual private network (VPNs) or network slices configured with different performance and scaling properties.

WAN 12 may comprise the Internet or another public network. In some cases, WAN 12 may comprise a multi-protocol label switching (MPLS) network. In some cases, WAN 12 may comprise a mobile communication network, such as a 5G mobile network. WAN 12 has underlay network topology 14. Underlay topology 14 may comprise an Internet Protocol (IP) fabric of nodes and links. Although illustrated in FIG. 1 as a single topology, in one example underlay topology 14 of WAN 12 may comprise two or more autonomous systems (ASes). In this example, WAN 12 and the disclosed techniques support inter-AS connectivity. Each AS may comprise a collection of network devices under the control of a network service provider that offers services to customers at sites 20 that access WAN 12. Services offered may include, for example, traditional Internet access, VoIP, video and multimedia services, and security services. Further example details of inter-AS connectivity in a WAN are described in U.S. patent application Ser. No. 15/084,769, filed Mar. 30, 2016, the entire contents of which are incorporated herein by reference.

In the illustrated example of FIG. 1, WAN 12 includes a controller device 15 and PE routers 16A-16D ("PE routers 16"). Controller 15 of WAN 12 may comprise a software defined network (SDN) controller that provides centralized control of customer sessions and communication flows within WAN 12 by configuring and managing the virtual networks established over underlay topology 14. Controller 15, therefore, may configure and manage the routing and switching infrastructure within WAN 12 (e.g., including PE devices 20, PE devices 16 and additional transit routers and switches not shown in FIG. 1). Further example details of an SDN controller are described in U.S. Pat. No. 9,898,317, issued Feb. 20, 2018, and U.S. Pat. No. 9,794,165, issued Oct. 17, 2017, the entire contents of each of which are incorporated herein by reference.

Each of PE routers 16 couples to one or more of remote sites 20 via customer edge (CE) routers 18A-18D ("CE routers 18"). For example, PE router 16A is coupled to site 20A via CE router 18A, PE router 16B is coupled to site 20B via CE router 18B, PE router 16C is coupled to site 20C via CE router 18C, and PE router 16D is coupled to site 20D via CE router 18D. Each of PE routers 16 maintains a link state database (LSDB) associated with a link state routing protocol of interior gateway protocol (IGP), such as open shortest path first (OSPF) and intermediate system-to-intermediate system (IS-IS). The contents of the LSDB of a given PE router, e.g., PE router 20A, includes a full view of underlay topology 14 of WAN 12.

Each of sites 20 may include a local area network (LAN) or a wide area network (WAN) that comprises a plurality of subscriber devices, such as desktop computers, laptops, workstations, PDAs, wireless devices, network-ready appliances, file servers, print servers or other devices. In some examples, at least one of sites 20 may comprise a data center site having specialized facilities that provide storage, management, and dissemination of data to subscribers and other entities. A data center site may include, for example, a plurality of servers and storage area networks (SANs) that provide computing environments for subscribers/customers. Subscriber devices may connect to the data center site to request and receive services and data provided by the data center site.

As described above, one or more of sites 20 may be connected via virtual networks established across WAN 12 to enable sites 20 to securely share data over WAN 12. As shown in FIG. 1, sites 20A-20C are connected across WAN 12 via virtual network 22A that includes participating PE routers 16A-16C. In addition, sites 20C and 20D are connected across WAN 12 via virtual network 22B that includes participating PE routers 16C and 16D.

The techniques of this disclosure are directed to supporting multiple virtual networks 22 over underlay network topology 14 of WAN 12. The techniques may provide support for network slicing as required by the 5G mobile network specification being developed by the $3^{rd}$ Generation Partnership Project (3GPP), which envisions a set of overlay networks with different performance and scaling properties over a common underlay network, as well as enhanced VPN services in general. Current example solutions require storing per-VPN state on every resource (link or node) in the underlay network which is inherently unscalable.

The disclosed techniques define a mechanism by which specific resources (e.g., links and/or nodes) of underlay network topology 14 can be used by a specific virtual network or set of virtual networks. In accordance with the disclosed techniques, controller 15 is configured to allocate a subset of the resources of underlay network topology 14 to a respective one of virtual networks 22 (e.g., virtual network 22A).

The subset of resources allocated to virtual network 22A, for example, includes one or more nodes and one or more links of underlay network 14 to be used by virtual network 22A. In some examples, the subset of resources allocated to virtual network 22A may be a dedicated subset of resources that are only used to forward traffic of virtual network 22A.

In other examples, the subset of resources allocated to virtual network 22A may be at least partially shared and used to forward traffic of multiple virtual networks, e.g., virtual network 22A and virtual network 22B.

The subset allocation approach is based on differentiated services code point (DSCP)-based forwarding in underlay network 14 of WAN 12. For each of virtual networks 22 built over underlay network topology 14, controller 15 allocates a subset of resources to the respective virtual network based on source information, destination information, and classification information for traffic of the respective virtual network. The classification information may comprise DSCP information used to indicate quality of service (QoS), e.g., high priority or best effort delivery, for the traffic. For example, controller 15 allocates resources per [link, node] based upon a [source, destination, DSCP] traffic matrix. As a more specific example, for virtual network 22A, controller 15 may allocate certain links and/or nodes of underlay network topology 14 that are used to build routes between pairs of source and destination devices (e.g., two of CE devices 18A-18C) and that are capable of delivering the traffic from the source device to the destination device in accordance with the DSCP value. In this way, each of virtual networks 22 is assigned a subset, either dedicated or shared, of the resources in underlay network topology 14.

In different examples, controller 15 may allocate the resources at the granularity of all PE routers participating in a given virtual network, a set of PE routers in a given virtual network, or an individual PE router participating in a given virtual network. For example, in some cases, controller 15 may allocate the same subset of resources to all of the PE routers that are participating in virtual network 22A, i.e., PE routers 16A-16C. In other cases, controller 15 may allocate a first portion of the subset of resources to a first group of the PE routers that are participating in virtual network 22A, e.g., PE routers 16A and 16B, and allocate a different, second portion of the subset of resources to a second group of the PE routers that are participating in virtual network 22A, e.g., PE router 16C. In further cases, controller 15 may allocate different resources of the subset of resources to each of the PE routers that are participating in virtual network 22A. In this way, one or more of the PE routers 16A-16C that are participating in virtual network 22A may have a different, restricted view of underlay network 10 for virtual network 22A.

Controller 15 is further configured to advertise the subset of resources to PE routers 16 that are participating in the respective virtual network (e.g., PE routers 16A-16C participating in virtual network 22A). In some examples, controller 15 may advertise the subset of resources for virtual network 22A to the participating PE routers 16A-16C using BGP-LS (Border Gateway Protocol-Link State). In addition, controller 15 may advertise the subset of resources for virtual network 22A to the participating PE routers 16A-16C using one or more of a route target (RT) that identifies the virtual network, RT constraints, or route reflectors. In accordance with the disclosed techniques, the BGP-LS advertisements may be tagged using RTs to identify virtual network 22A for which the advertisement is being sent. In this way, controller 15 provides the participating PE routers with a customized and restricted view of underlay network topology 14 for the respective virtual network (e.g., virtual network 22A).

In some cases, controller 15 may first send the advertisement for virtual network 22A to one or more route reflectors in underlay network 14. As one example, controller 15 or the route reflector may send the advertisement for virtual network 22A to all of the PE routers 16 within underlay network 14. Each of PE routers 16 may then import or discard the advertisement based on whether the respective PE router is participating in virtual network 22A identified by the RT included in the advertisement. As another example, the route reflector may use RT constraints to only send the advertisement for virtual network 22A to PE routers 16A-16C that are participating in virtual network 22A.

The Route Target BGP Extended Community is described in more detail in S. Sangli, et al., "BGP Extended Communities Attribute," Internet Engineering Task Force (IETF) RFC 4360, February 2006, the entire contents of which are incorporated herein by reference. RT constraints are described in more detail in P. Marques et al., "Constrained Route Distribution for Border Gateway Protocol/MultiProtocol Label Switching (BGP/MPLS) Internet Protocol (IP) Virtual Private Networks (VPNs)," Internet Engineering Task Force (IETF) RFC 4684, November 2006, the entire contents of which are incorporated herein by reference.

It may be advantageous to use BGP-LS to encode the allocated subset of resources for the following reasons. First, BGP-LS is BGP-based such that it integrates naturally with existing BGP-based virtual network infrastructure. Second, BGP-LS supports segment routing, which may be necessary to enforce the PE routers' usage of the resources allocated to the virtual network or set of virtual networks. Third, BGP-LS supports inter-AS connectivity, which may be a prerequisite for supporting existing BGP-based virtual network infrastructure. Fourth, BGP-LS is canonical in that it can be used to advertise the resources of either OSPF or IS-IS. The BGP-LS protocol is described in additional detail in H. Gredler, et al., "North-Bound Distribution of Link-State and Traffic Engineering (TE) Information using BGP," Internet Engineering Task Force (IETF) RFC 7752, March 2016, the entire contents of which are incorporated herein by reference.

In further accordance with the disclosed techniques, each of PE routers 16 participating in virtual network 22A, e.g., PE routers 16A-16C, is configured to generate the restricted view of underlay network topology 14 for virtual network 22A based on the advertised subset of resources for virtual network 22A received from controller 15. For example, each of PE routers 16A-16C may be configured to annotate its LSDB to indicate which resources of underlay network topology 14 are allocated for virtual network 22A. As one example, PE router 16A may add flags or other indicators to its LSDB to mark the advertised subset of resources as usable by PE router 16A for virtual network 22A and, essentially, mask-off or ignore the remaining resources of underlay network topology 14 included in the LSDB. Each of PE routers 16A-16C participating in virtual network 22A may, therefore, have a restricted view of the full underlay network topology 14 and, thus, only use the subset of resources in the restricted view to generate routing and forwarding tables for virtual network 22A.

In this way, instead of adding per-virtual network state on every resource in the underlay network, the disclosed techniques add per-virtual network state to only those PE routers participating in the respective virtual network. In addition, the disclosed techniques follow the scalability model of existing BGP-based virtual network infrastructure, which is that the per-virtual network information is restricted to only those PE routers that are participating in the virtual network and that additional transit routers and switches within the underlay topology have no per-virtual network state.

Figure 2:
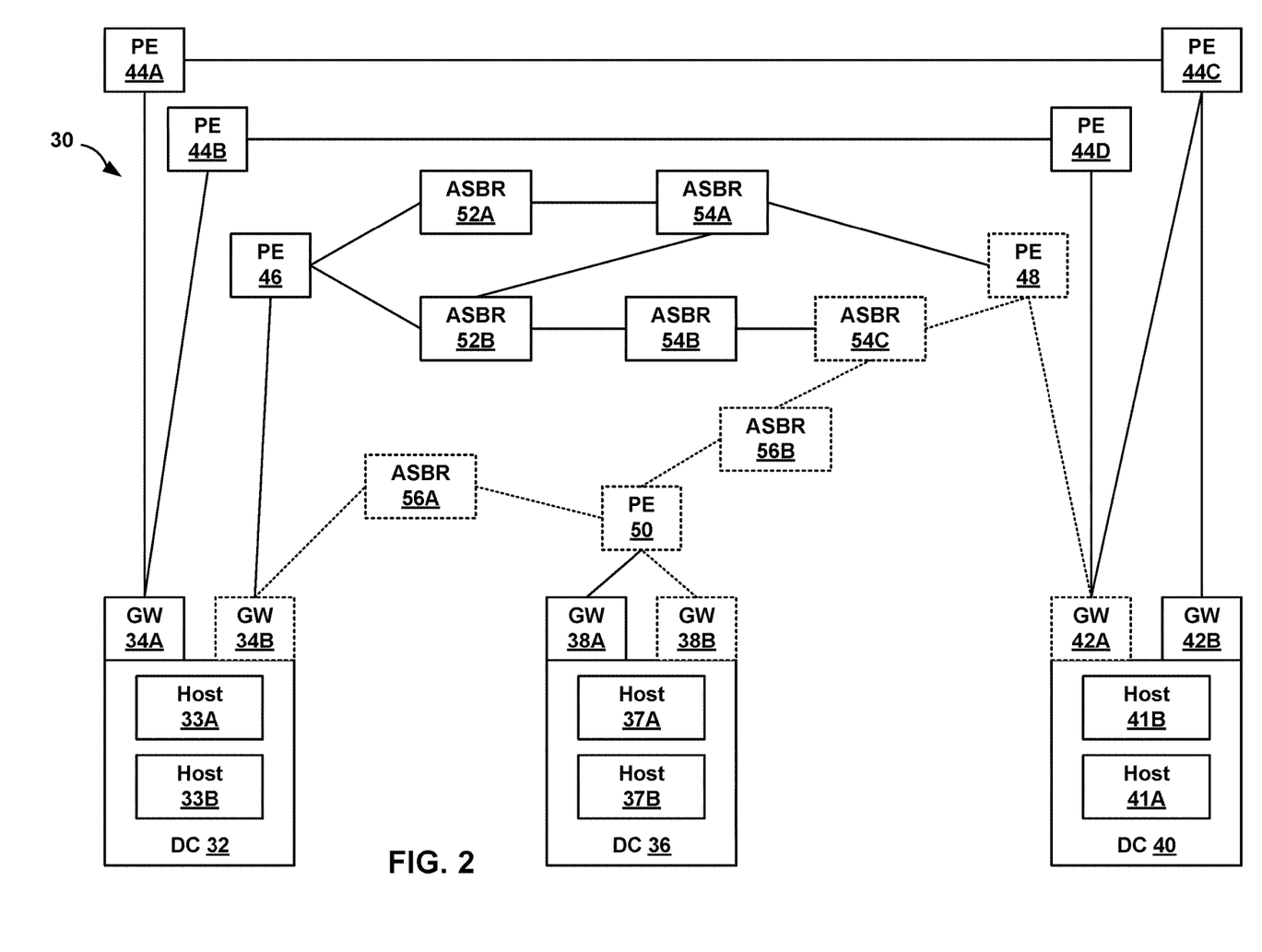
FIG. 2 is a block diagram illustrating an example subset of resources in an underlay network topology allocated to a virtual network, in accordance with the techniques of this disclosure.

FIG. 2 is a block diagram illustrating an example subset of resources in an underlay network topology allocated to a virtual network, in accordance with the techniques of this disclosure.

The underlay network topology 30 illustrated in FIG. 2 includes a plurality of PE routers (e.g., PE 44A-44D, PE 46, PE 48, and PE 50) and a plurality of autonomous system boundary routers (ASBRs) (e.g., ASBR 52A-52B, ASBR 54A-54C, and ASBR 56A-56B). In addition, the underlay network topology 30 includes multiple gateway network devices (e.g., GW 34A-34B, GW 38A-38B, and GW 42A-42B) connecting the underlay network topology 30 to data center sites (DC 32, DC 36, and DC 38). For purposes of illustration, each of the gateway network devices may be considered PE routers of the underlay network topology 30.

As one specific example, PE routers GW 34B, GW 38B, and GW 42A may be the PE routers participating in a virtual network, such as a VPN or a network slice. In accordance with the disclosed techniques, a subset of the resources included in the overall underlay network topology 30 is allocated to the virtual network and distributed to each of the PE routers participating in the virtual network.

The example subset topology, illustrated in FIG. 2 using dotted lines, includes:
GW 34B <-> ASBR 56A
ASBR 56A <-> PE 50
PE 50 <-> GW 38B
PE 50 <-> ASBR 56B
ASBR 56B <-> ASBR 54C
ASBR 54C <-> PE 48
PE 48 <-> GW 42A In some examples, a network controller allocates the subset of resources for the virtual network, and advertises the subset topology to the participating PE routers (e.g., GW 34B, GW 38B, and GW 42A) using BGP-LS. Upon receipt of the BGP-LS advertisements, each of the participating PE routers generates a restricted view of the full underlay network topology and only uses the subset topology in the restricted view to perform routing services for the virtual network. For example, each of the participating PE routers may annotate its LSDB to indicate which resources of the underlay network are allocated for the virtual network identified in the BGP-LS advertisements. In this way, instead of adding per-virtual network state on every resource in the underlay network, the disclosed techniques add per-virtual network state to only those PE routers participating in the virtual network.

Figure 3:
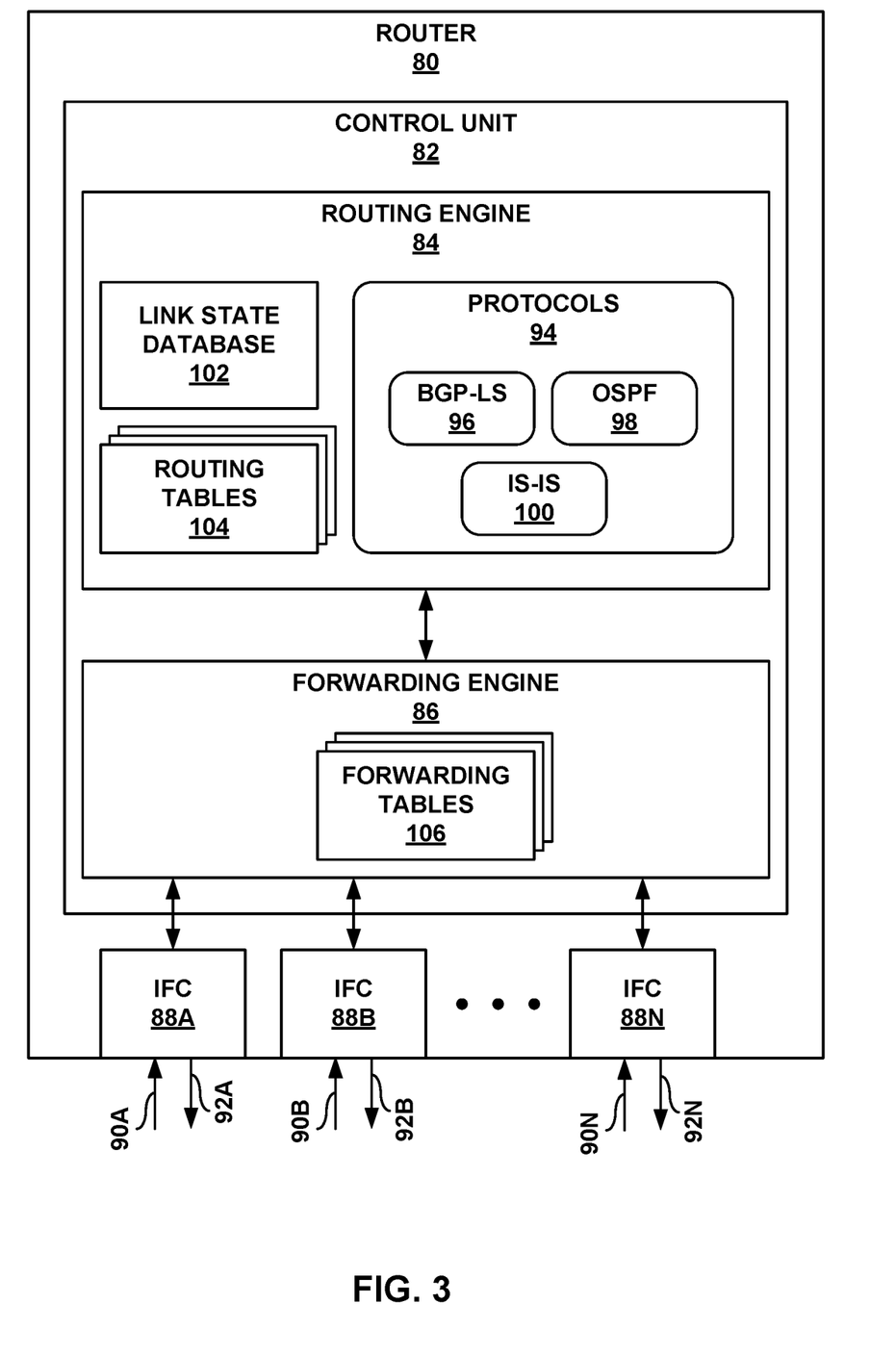
FIG. 3 is a block diagram illustrating an example router configured to annotate its link state database to indicate which resources in an underlay network are allocated for virtual networks in which the router participates, in accordance with the techniques of this disclosure.

FIG. 3 is a block diagram illustrating an example router configured to annotate its link state database to indicate which resources in an underlay network topology are allocated for virtual networks in which the router participates, in accordance with the techniques of this disclosure.

In general, router 80 may operate substantially similar to any of PEs 16 of FIG. 1. In the illustrated example of FIG. 3, router 80 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a forwarding engine 86. Control unit 82 provides an operating environment for routing engine 84 and may be implemented solely in software, or hardware, or may be implemented as a combination of software, hardware or firmware. For example, control unit 82 may include one or more processors (not shown) which execute software instructions. In that example, routing engine 84 may include various software modules or daemons (e.g., one or more routing protocol processes, management processes, user interfaces, and the like), and control unit 82 may include a computer-readable storage medium, such as computer memory or hard disk, for storing executable instructions.

Routing engine 84 operates as the control plane for router 80 and includes an operating system that provides a multi-tasking operating environment for execution of a number of concurrent processes. Routing engine 84 may implement one or more protocols 94 to execute routing processes. For example, protocols 94 may include BGP-LS 96, OSPF 98, and IS-IS 100 for exchanging link state information with other routing devices in the computer network. Routing engine 84 uses the Interior Gateway Protocol (IGP) link state routing protocols, OSPF 98 and IS-IS 100, to exchange routing information with other routing devices in the same IGP area or autonomous system (AS) in order to discover the topology of the IGP area or AS and update link state database (LSDB) 102. Routing engine 84 maintains LSDB 102 configured to store link state information about nodes and links within the computer network in which router 80 resides, e.g., underlay topology 14 of WAN 12 from FIG. 1. For example, LSDB 102 may include one or more of local/remote internet protocol (IP) addresses, local/remote interface identifiers, link metrics and traffic engineering (TE) metrics, link bandwidth, reservable bandwidth, class of service (CoS) reservation state, preemption, or shared risk link groups (SRLG).

Routing engine 84 may use BGP-LS 96 to share link state information collected by the IGP link state routing protocols with external components, such as a network controller device, e.g., controller 15 from FIG. 1. In accordance with the techniques described in this disclosure, routing engine 84 may also use BGP-LS 96 to receive a subset of resources allocated to a given virtual network in which router 80 is participating by the network controller device. BGP-LS 96 comprises a new BGP Network Layer Reachability Information (NLRI) encoding format. In BGP-LS 96, the MP_REACH_NLRI and MP_UNREACH_NLRI attributes are used to carry opaque information, including the subset of resources allocated to the given virtual network. For example, each link state NLRI describes either a node, a link, or a prefix.

Routing tables 104 may describe various routes within the network and the appropriate next hops for each route, i.e., the neighboring routing devices along each of the routes. Routing engine 84 analyzes LSDB 102 to generate routing tables 104 and install forwarding data structures into forwarding tables 106 of forwarding engine 86. In accordance with the disclosed techniques, routing engine 84 may generate a separate one of routing tables 104 and forwarding tables 106 for each of the virtual networks in which router 80 participates. The separate routing and forwarding tables created for each of the virtual networks in which router 80 participates are called Virtual Routing and Forwarding (VRF) tables. In general, one of routing tables 104 comprises a global routing table for the entire computer network in which router 80 resides, e.g., underlay topology 14 of WAN 12 from FIG. 1.

In accordance with the disclosed techniques, routing engine 84 is configured to annotate LSDB 102 to indicate which resources of the underlay topology of the computer network are allocated for a given virtual network. As one example, in response to BGP-LS advertisements received from a controller device for the given virtual network, routing engine 84 may add flags or other indicators to LSDB 102 to mark the advertised subset of resources as usable for the given virtual network. Routing engine 84 essentially masks-off or ignores the remaining resources of the underlay topology of the computer network included in LSDB 102 when performing routing services for the given virtual network. In this way, routing engine 84 has a restricted view of the full underlay topology of the computer network and, thus, only uses the subset of resources in the restricted view to generate one of routing tables 104 and one of forwarding tables 106 for the given virtual network.

Forwarding engine 86 operates as the data plane for router 80 for forwarding network traffic. In some examples, forwarding engine 86 may comprise one or more packet forwarding engines (PFEs) (not shown) that may each comprise a central processing unit (CPU), memory and one or more programmable packet-forwarding application-specific integrated circuits (ASICs). Forwarding tables 106 may associate, for example, network destinations with specific next hops and corresponding interface ports of IFCs 88. Forwarding tables 106 may be a radix tree programmed into dedicated forwarding chips, a series of tables, a complex database, a link list, a radix tree, a database, a flat file, or various other data structures.

The architecture of router 80 illustrated in FIG. 3 is shown for exemplary purposes only. The techniques of this disclosure are not limited to this architecture. In other examples, router 80 may be configured in a variety of ways. In one example, some of the functionally of control unit 82 may be distributed within IFCs 88 or a plurality of packet forwarding engines (PFEs) (not shown). Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

Figure 4:
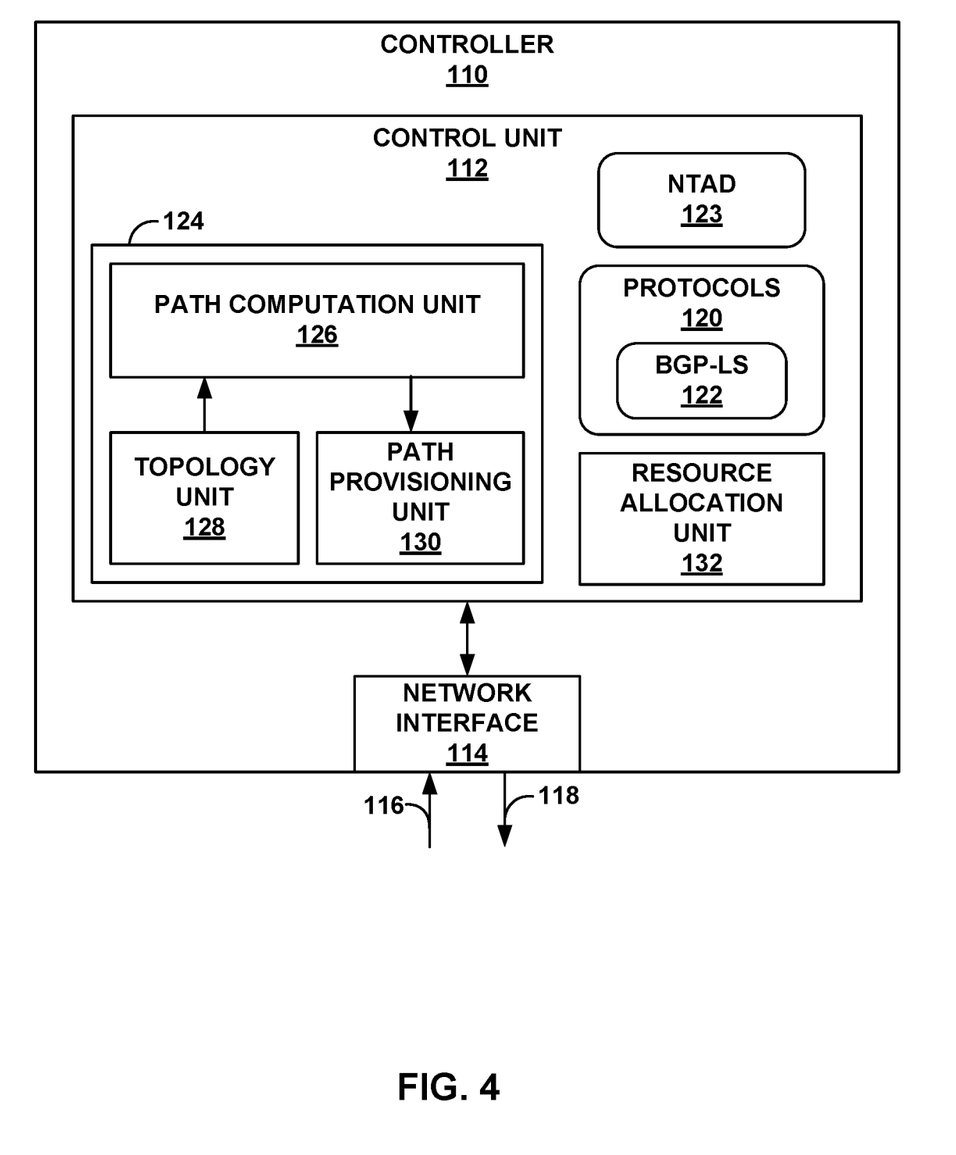
FIG. 4 is a block diagram illustrating an example controller configured to allocate subsets of resources in an underlay network to different virtual networks, and advertise the subsets of resources to PE routers that are participating in the virtual networks, in accordance with the techniques of this disclosure.

FIG. 4 is a block diagram illustrating an example controller configured to allocate subsets of resources in an underlay network topology to different virtual networks, and advertise the subsets of resources to PE routers that are participating in the virtual networks, in accordance with the techniques of this disclosure. For purposes of illustration, controller device 110 may be described herein within the context of network system 10 of FIG. 1, and may represent controller 15. The architecture of controller device 110 illustrated in FIG. 4 is shown for example purposes only and should not be limited to this architecture. In other examples, controller device 110 may be configured in a variety of ways.

Controller device 110 includes a control unit 112 coupled to a network interface 114 to exchange packets with other network devices by inbound link 116 and outbound link 118. Control unit 112 may include one or more processors (not shown) that execute software instructions, such as those used to define a software or computer program, stored to a computer-readable storage medium (not shown). Alternatively, or additionally, control unit 112 may comprise dedicated hardware for performing the techniques described herein.

Control unit 112 provides an operating environment for path computation element (PCE) 124, network topology abstractor daemon (NTAD) 123, and resource allocation unit 132. In one example, these units may be implemented as one or more processes executing on one or more virtual machines of one or more servers. That is, while generally illustrated and described as executing on a single controller device 110, aspects of these units may be delegated to other computing devices. Control unit 112 also provides an operating environment for several protocols 120, including BGP-LS 122.

Control unit 112 may use BGP-LS 122 to receive link state information from PE routers within a computer network, e.g., underlay topology 14 of WAN 12 from FIG. 1. Control unit 112 may also forward the received link state information to NTAD 123. NTAD 123 may generate a network topology (e.g., underlay topology 14 of WAN 12 from FIG. 1) based on the received link state information.

As illustrated in FIG. 3, PCE 124 includes a path computation unit 126, a topology unit 128, and a path provisioning unit 130. NTAD 123 may forward the topology data to topology unit 128 of PCE 124. Topology unit 128 may receive the topology data describing available resources of the computer network, including access, aggregation, and edge nodes, interfaces thereof, and interconnecting communication links. Path computation unit 126 of PCE 124 may use the topology data received by topology unit 128 to compute paths across the computer network. Upon computing the paths, path computation unit 126 may schedule the paths for provisioning by path provisioning unit 130. A computed path includes path information usable by path provisioning unit 130 to establish the path in the network. For example, path provisioning unit 130 may send the path information to network devices to instruct the network devices to establish at least a portion of the path in the network. Provisioning a path may require path validation prior to committing the path to provide for packet transport.

In accordance with the disclosed techniques, resource allocation unit 132 allocates a subset of the resources (e.g., nodes and/or links) included in the topology data of the computer network to a respective virtual network established over the computer network. For example, NTAD 123 may also forward the topology data to resource allocation unit 132. Resource allocation unit 132 may be configured to allocate the subset of resources to the respective virtual network based on source information, destination information, and classification information for traffic of the respective virtual network. The classification information may comprise DSCP information used to indicate QoS, e.g., high priority or best effort delivery, for the traffic. Control unit 112 may then use BGP-LS 122 to advertise the subset of resources to one or more network devices that are participating in the respective virtual network (e.g., PE routers 16A-16C participating in virtual network 22A of FIG. 1) as a restricted view of the underlay network topology for the respective virtual network. The BGP-LS advertisements may be tagged using RTs to identify the respective virtual network. For example, control unit 112 may advertise the subset of resources to PE routers 16A-16C participating in virtual network 22A using one or more of a RT that identifies virtual network 22A, RT constraints, or route reflectors.

Figure 5:
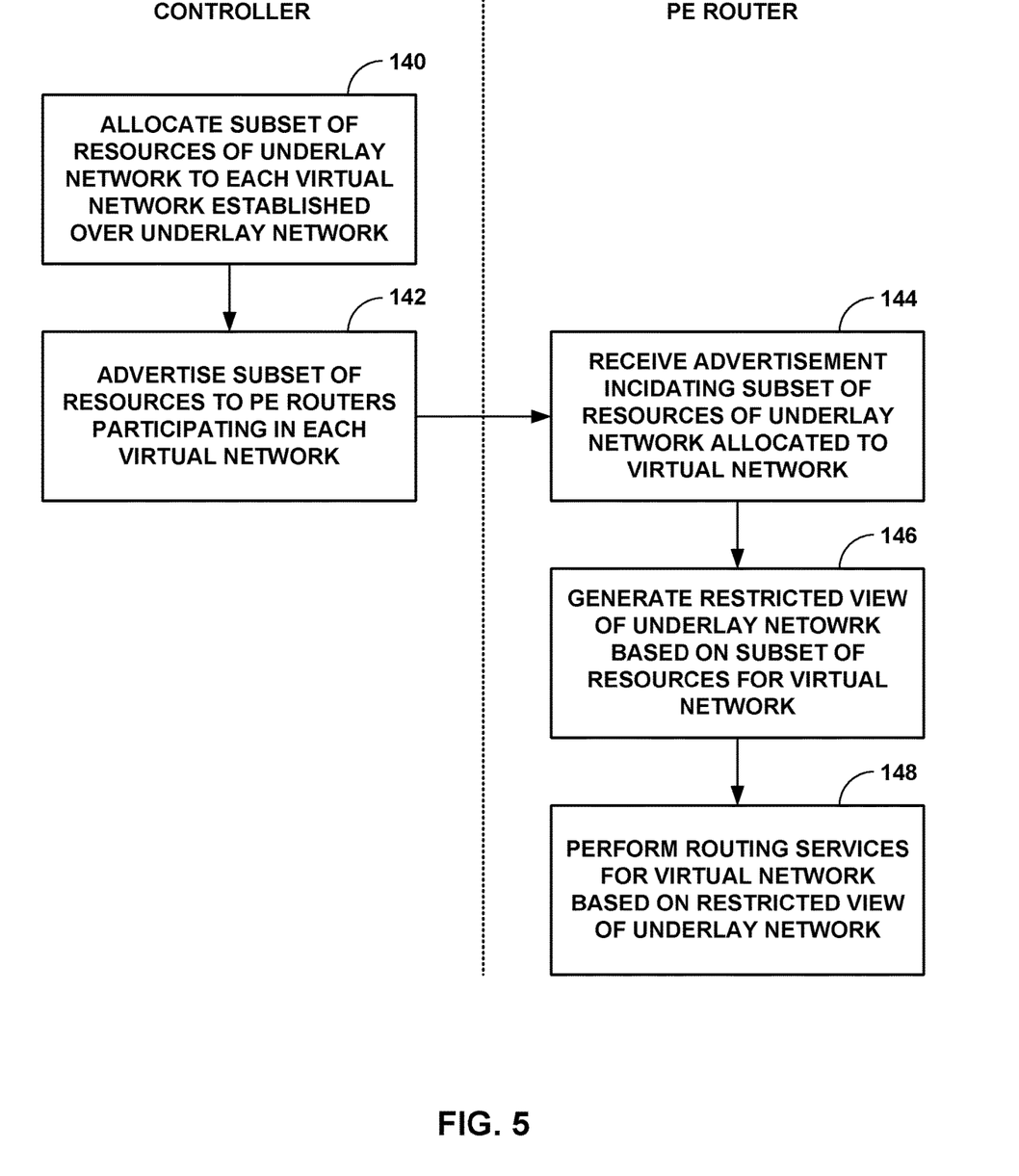
FIG. 5 is a flowchart illustrating an example operation of a controller and a PE router configured to support multiple virtual networks over an underlay network topology, in accordance with one or more example techniques described in this disclosure.

FIG. 5 is a flowchart illustrating an example operation of a controller and a PE router configured to support multiple virtual networks over an underlay network topology, in accordance with one or more example techniques described in this disclosure. The operation of FIG. 5 is described with respect to controller 15 and one of PE routers 16 from FIG. 1. In other examples, the operation of FIG. 5 may be performed controller 110 of FIG. 4 and/or router 80 from FIG. 3.

Controller 15 allocates a subset of resources of underlay network topology 14 to each of one or more virtual networks 22 established over underlay network 14 (140). Underlay network 14 may comprise an IP fabric of nodes and links. In some examples, underlay network 14 comprises a WAN that includes one or more autonomous systems. As described above, virtual networks 22 may comprise one or more VPNs or multiple network slices with different performance and scaling properties on top of underlay network 14. The subset of resources allocated to a respective virtual network, e.g., virtual network 22A, includes one or more nodes and one or more links of underlay network 14 to be used by virtual network 22A. In some examples, the subset of resources allocated to virtual network 22A may be a dedicated subset of resources that are only used to forward traffic of virtual network 22A. In other examples, the subset of resources allocated to virtual network 22A may be at least partially shared and used to forward traffic of multiple virtual networks, e.g., virtual network 22A and virtual network 22B.

Controller 15 may allocate the subset of resources to virtual network 22A based on source information, destination information, and classification information for traffic of virtual network 22A. The classification information may comprise DSCP information used to indicate quality of service (QoS), e.g., high priority or best effort delivery, for the traffic. For example, controller 15 may allocate certain links and/or nodes of underlay network 14 that are used to build routes between pairs of source and destination devices in accordance with the DSCP value for the traffic of virtual network 22A.

Moreover, controller 15 may allocate the subset of resources to virtual network 22A with a PE router level of granularity. For example, in some cases, controller 15 may allocate the same subset of resources to all of the PE routers that are participating in virtual network 22A, i.e., PE routers 16A-16C. In other cases, controller 15 may allocate a first portion of the subset of resources to a first group of the PE routers that are participating in virtual network 22A, e.g., PE routers 16A and 16B, and allocate a different, second portion of the subset of resources to a second group of the PE routers that are participating in virtual network 22A, e.g., PE router 16C. In further cases, controller 15 may allocate different resources of the subset of resources to each of the PE routers that are participating in virtual network 22A. In this way, one or more of the PE routers that are participating in virtual network 22A may have a different, restricted view of underlay network 14 for virtual network 22A.

After allocating the subset of resources to virtual network 22A, controller 15 advertises the subset of resources to the plurality of PE routers 16, i.e., PE routers 16A-16C, that is participating in virtual network 22A as a restricted view of underlay network 14 for virtual network 22A (142). According to the disclosed techniques, controller 15 may advertise the subset of resources to the plurality of PE routers 16A-16C using BGP-LS advertisements. In addition, controller 15 may advertise the subset of resources using a RT that identifies virtual network 22A in which the plurality of PE routers 16A-16C is participating. In some cases, controller 15 may first send the advertisement for virtual network 22A to one or more route reflectors in underlay network 14. As one example, controller 15 or a route reflector may send the advertisement for virtual network 22A to all of the PE routers 16 within underlay network 14. Each of PE routers 16 may then import or discard the advertisement based on whether the respective PE router is participating in virtual network 22A, as indicated by the RT included in the advertisements. As another example, a route reflector may use RT constraints to only send the advertisement for virtual network 22A to the plurality of PE routers 16A-16C that are participating in virtual network 22A.

PE router 16A, as an example, receives the advertisement indicating the subset of resources of underlay network 14 allocated to virtual network 22A in which PE router 16A is participating (144). As previously discussed, in order to receive the advertisement for virtual network 22A, PE router 16A may determine that the advertisement includes the RT that identifies virtual network 22A and import the advertisement. In some examples, PE router 16A may receive the advertisement from a route reflector that uses RT constraints to only send advertisements with RTs that match an import list of PE router 16A.

Upon receipt of the advertisement for virtual network 22A, PE router 16A generates the restricted view of underlay network 14 based on the subset of resources for virtual network 22A (146). In some examples, PE router 16A is configured to annotate its link state database based on the advertised subset of resources in order to indicate which resources of underlay network 14 are available for virtual network 22A, and mask-off or ignore the remaining resources of underlay network 14. PE router 16A then performs routing services for virtual network 22A based on the restricted view of underlay network 14 (148). For example, PE router 16A is configured to generate a routing table and a forwarding table for virtual network 22A using only the subset of resources available in the restricted view of underlay network 14.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A system comprising:
a controller device comprising a network interface and a control unit comprising at least one processor configured to:
allocate a subset of resources within an underlay network to each of one or more virtual networks established over the underlay network, wherein the subset of resources allocated to a respective virtual network includes one or more nodes and one or more links within the underlay network to be used by the respective virtual network, and
send an advertisement of the subset of resources to each provider edge (PE) router of a plurality of PE routers that are participating in the respective virtual network; and
a PE router of the plurality of PE routers participating in the respective virtual network, the PE router comprising a plurality of network interfaces and a control unit comprising at least one processor configured to:
receive the advertisement indicating the subset of resources within the underlay network allocated to the respective virtual network in which the PE router is participating,
generate a restricted view of the underlay network based on the subset of resources for the virtual network, and
perform routing services for the virtual network based on the restricted view of the underlay network.

2. The system of claim 1, wherein, to generate the restricted view of the underlay network, the control unit of the PE router is configured to annotate a link state database of the PE router based on the subset of resources in order to indicate which resources within the underlay network are available for the virtual network.

3. The system of claim 1, wherein, to perform routing services, the control unit of the PE router is configured to generate a routing table and a forwarding table for the virtual network using only the subset of resources available in the restricted view of the underlay network.

4. The system of claim 1, wherein, to receive the advertisement indicating the subset of resources, the control unit of the PE router is configured to determine that the advertisement includes a route target (RT) that identifies the virtual network in which the PE router is participating.

5. The system of claim 1, wherein, to receive the advertisement indicating the subset of resources, the control unit of the PE router is configured to receive the advertisement from a route reflector that uses RT constraints.

6. A method of comprising:
allocating, by a controller device, a subset of resources within an underlay network to each of one or more virtual networks established over the underlay network, wherein the subset of resources allocated to a respective virtual network includes one or more nodes and one or more links within the underlay network to be used by the respective virtual network;
sending, by the controller device, an advertisement of the subset of resources to each provider edge (PE) router of a plurality of PE routers that are participating in the respective virtual network;
receiving, by a respective PE router of the plurality of PE routers participating in the respective virtual network, the advertisement indicating the subset of resources within the underlay network allocated to the respective virtual network;
generating, by the respective PE router, the restricted view of the underlay network based on the subset of resources for the respective virtual network; and
performing, by the respective PE router, routing services for the respective virtual network based on the restricted view of the underlay network.

7. The method of claim 6, wherein generating the restricted view of the underlay network comprises annotating, by the respective PE router, a link state database of the respective PE router based on the subset of resources in order to indicate which resources within the underlay network are available for the respective virtual network.

8. The method of claim 6, wherein performing routing services comprises generating, by the respective PE router, a routing table and a forwarding table for the respective virtual network using only the subset of resources available in the restricted view of the underlay network.

* * * * *